United States Patent
Burroughs et al.

(10) Patent No.: US 7,389,368 B1
(45) Date of Patent: Jun. 17, 2008

(54) INTER-DSP SIGNALING IN A MULTIPLE DSP ENVIRONMENT

(75) Inventors: William G. Burroughs, Macungie, PA (US); Steven J. Pollock, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/489,652

(22) Filed: Jan. 24, 2000

(51) Int. Cl.
*G06F 3/00* (2006.01)
*G06F 13/24* (2006.01)

(52) U.S. Cl. .......................... 710/100; 710/1; 710/260

(58) Field of Classification Search ........ 709/200–253; 718/100–108; 710/100, 200–269, 1; 370/200–546; 712/5, 35, 40
See application file for complete search history.

(56) References Cited

U.S. PATENT DOCUMENTS

| | | | | |
|---|---|---|---|---|
| 3,896,418 A * | 7/1975 | Brown | ....................... | 711/150 |
| 4,862,452 A | 8/1989 | Milton et al. | | |
| 5,185,736 A * | 2/1993 | Tyrrell et al. | ................ | 370/358 |
| 5,581,748 A * | 12/1996 | Anderson | .................... | 713/502 |
| 5,631,592 A * | 5/1997 | Schwarz et al. | ............. | 327/172 |
| 6,009,389 A * | 12/1999 | Dokic et al. | ................. | 704/228 |
| 6,065,078 A * | 5/2000 | Falik et al. | .................. | 710/100 |
| 6,065,131 A * | 5/2000 | Andrews et al. | ............. | 713/600 |
| 6,111,935 A * | 8/2000 | Hughes-Hartogs | ........ | 379/27.01 |
| 6,219,417 B1 * | 4/2001 | Zhou | ........................... | 379/377 |
| 6,275,502 B1 * | 8/2001 | Arimilli | ...................... | 370/468 |
| 6,457,140 B1 * | 9/2002 | Lindberg et al. | ................ | 714/6 |
| 6,535,505 B1 * | 3/2003 | Hwang et al. | .............. | 370/352 |
| 6,691,190 B1 * | 2/2004 | Burroughs et al. | .......... | 710/100 |
| 6,856,600 B1 * | 2/2005 | Russell et al. | ............... | 370/244 |

* cited by examiner

*Primary Examiner*—Meng-Ai T. An
*Assistant Examiner*—Kenneth Tang
(74) *Attorney, Agent, or Firm*—Steve Mendelsohn

(57) ABSTRACT

The invention includes a method and apparatus for synchronizing a first processor with a second processor. The method includes storing in a register parallel bits of data from the first processor, wherein at least one bit of data is a logic ONE. An output signal is formed from the one bit of data in the register. The output signal is sent as an interrupt signal to an interrupt terminal of the second processor for synchronizing the first processor with the second processor. The method may be used with a memory mapped register or an off-core register. The first and second processors may each be a digital signal processor (DSP) or any other type of processor.

29 Claims, 5 Drawing Sheets

INTER-DSP SIGNALING IN A MULTIPLE DSP ENVIRONMENT

FIELD OF THE INVENTION

The present invention relates generally to digital signal processors (DSPs) and, more particularly, to interrupt signaling between one DSP and other DSPs.

BACKGROUND OF THE INVENTION

Advances in very large scale integration have contributed to the current digital signal processors (DSPs). These processors are special purpose microprocessors characterized by architectures and instructions suitable for digital signal processing applications. DSPs are utilized in a number of applications from communications and controls to speech and image processing. Special purpose DSPs, designed for a specific signal processing application, such as for fast fourier transform (FFT) have also emerged.

One such DSP, for example the TMS320C30, supports fixed- and floating-point operations. Features of this processor include 32 bit by 32 bit floating-point multiply operations in one instruction cycle time of 60 nsec. Since a number of instructions, such as load and store, multiply and add, can be performed in parallel in one cycle time, the TMS320C30 can execute a pair of instructions in 30 nsec, allowing for 33.3 MIPS. The TMS320C30 has 2K words of on-chip memory and 16 million words of addressable memory spaces for program, data and input/output. Specialized instructions are available to make common DSP algorithms, such as filtering and spectral analysis, execute fast and efficiently. Like other microprocessors, the DSP may take advantage of higher level languages, such as C and ADA.

In a system having multiple independent DSPs, it is often necessary to synchronize the bit streams running from one DSP to another DSP, and for one DSP to inform or signal another DSP that a specific event has occurred. For example, each DSP may be processing its own independent task, or processing a subset of a task shared by multiple DSPs. When a DSP completes processing a first subset of the task, the DSP signals the other DSP that the first subset has been completed. The other DSP may then perform a second subset of the task. The processors may also exchange data and status information, so that order-dependent processing may proceed correctly.

FIG. 1 illustrates a conventional approach of signaling from one DSP to another DSP. As shown, processing system 10 includes DSP0, designated as 12, and DSP1, designated as 14. Dedicated lines are connected between DSP0 and DSP1 for providing the signaling function. For example, output 1 terminal of DSP0 provides signal 1 to interrupt 1 terminal of DSP1. By using signal 1, DSP0 informs DSP1 that a specific event has occurred. Signal 1 appears as an interrupt signal to DSP1. FIG. 1 also shows signal 2 placed on another dedicated line between DSP0 and DSP1 for providing a second interrupt to DSP1.

Only a limited number of output terminals in a DSP are available for signaling another DSP. This is a disadvantage as additional signaling may be needed to signal other DSPs in a system. A need exists, therefore, to provide a means for signaling a processor from another processor without depending on the availability of output terminals. The output terminals may then be used for other purposes.

SUMMARY OF THE INVENTION

To meet this and other needs, and in view of its purposes, the present invention provides a method for synchronizing a first processor with a second processor. The method includes storing in a register parallel bits of data from the first processor, wherein at least one bit of data is a logic ONE. An output signal is formed from the one bit of data in the register. The output signal is sent as an interrupt signal to an interrupt terminal of the second processor for synchronizing the first processor with the second processor. The method may be used with a memory mapped register or an off-core register. The first and second processor may be DSP processors or any other type of processors.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

The present invention relates to communications between DSP cores that exist on the same physical chip and implemented as blocks on the chip, or as separate standalone devices implemented as discrete components on a board that utilizes discrete DSP chips. The present invention, although described for DSP applications, also relates to any other type of processor, such as a general purpose microprocessor, or a microcontroller, for example.

Figure 1:
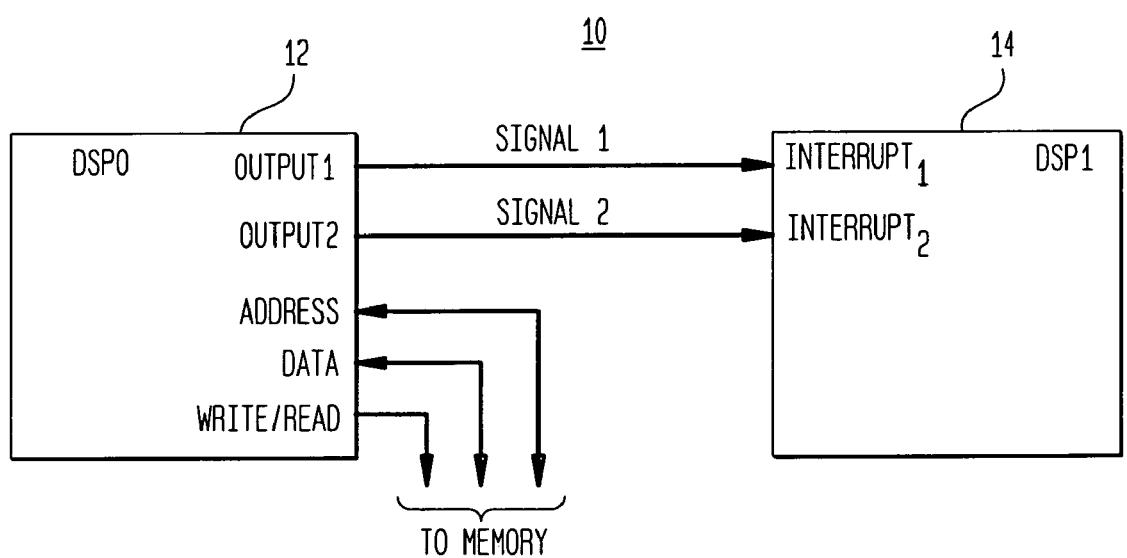
FIG. 1 is a block diagram illustrating a conventional system of signaling from one DSP to another DSP.
Figure 2:
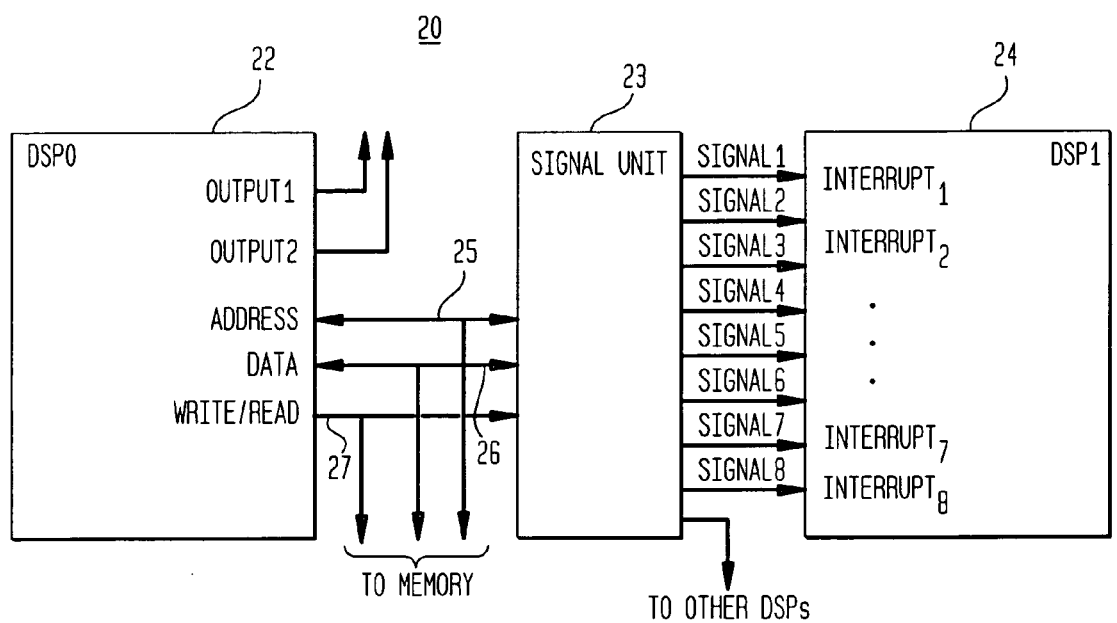
FIG. 2 is a block diagram illustrating an exemplary embodiment of an inter-DSP signaling system in accordance with the present invention.

FIG. 2 is a block diagram of inter-DSP signaling system 20 including DSP0 and DSP1, respectively designated as 22 and 24. Interposed between the two DSPs is signal unit 23. As will be explained in detail, signal unit 23 includes a multi-bit register, external to the DSP, that is mapped into the DSP0's memory space. Signal unit 23 also includes an edge detector to determine when a logic ONE is set in each bit of the register. Depending on which bit is set in the register, signal unit 23 generates a corresponding output signal from the set of signals (for example, signal 1-signal 8 shown in FIG. 2). One or more of the output signals generated by signal unit 23 is provided to the interrupt terminals (for example, $int_1$-$int_8$ shown in FIG. 2) of DSP1.

The output signals may be routed to maskable interrupt input terminals, non-maskable interrupt input terminals, or both types of interrupt terminals.

By writing a logic ONE to a predetermined address of the signal unit, DSPØ may synchronize with DSP1 by generating a maskable or non-maskable interrupt in DSP1. This method may be repeated between any pair of DSPs, permitting any DSP to signal any other DSP in the system. In addition, the output signals may be routed to multiple DSPs, as shown in FIG. 2. Signals 1-8 are shown routed to DSP1; another output signal (not labeled) may be routed to another DSP (not shown). Although a single output signal is shown being routed to other DSPs, there may be another set of eight output signals being routed to the other DSPs. As will be explained, the number of independent output signals is a function of the number of bits in the multi-bit register. For example, if signal unit 23 includes a 16-bit register, 16 independent output signals may be generated and routed to any 16 different interrupt input terminals of one or more DSPs.

It will be appreciated that the dedicated output terminals of DSPØ are available for other functions in system 20. For example, output 1 and output 2 terminals may be used for purposes other than providing interrupt signaling, as shown in FIG. 2.

Figure 3:
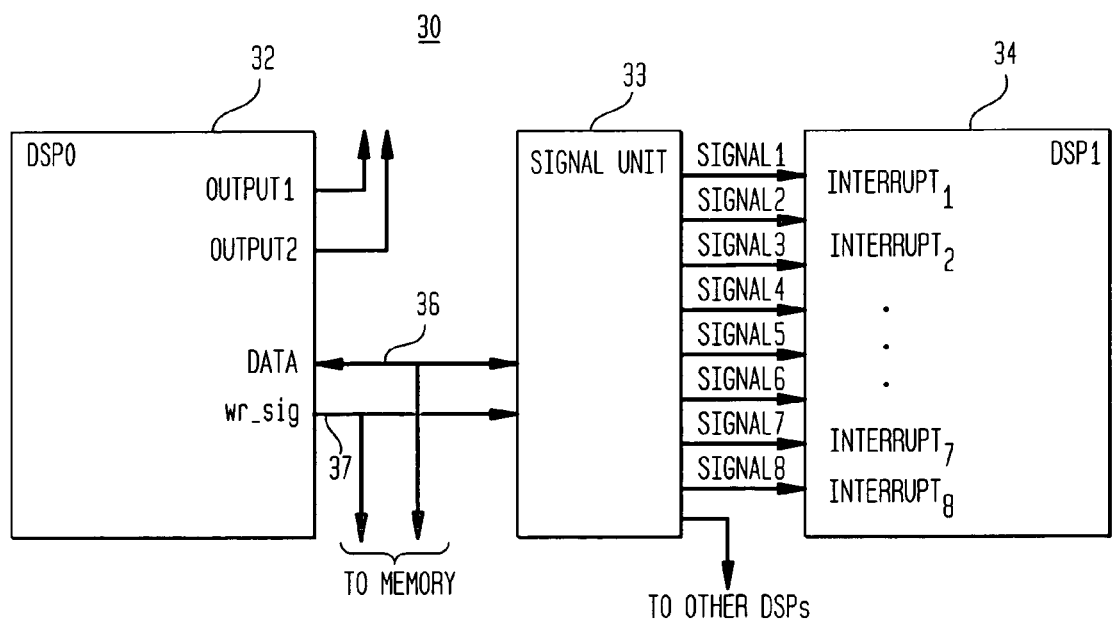
FIG. 3 is a block diagram illustrating another exemplary embodiment of an inter-DSP signaling system in accordance with the present invention.

FIG. 3 illustrates another embodiment of the invention, generally designated as 30. As shown, system 30 includes signal unit 33 generating output signals for DSPØ (designated as 32). DSPØ may synchronize with DSP1 (designated as 34) by using the output signals generated by signal unit 33 (designated as 33).

As will be explained, the inter-DSP signaling of system 30 is similar to the inter-DSP signaling of system 20, except for address decoding. System 30 does not require address decoding, while system 20 requires decoding. The difference in decoding is due to signal unit 23 (FIG. 2) having a memory-mapped register (not shown), while signal unit 33 (FIG. 3) has an off-core register (not shown) that is not accessible in the DSP's address space.

A memory-mapped register exists at a particular address in the DSP's address space. The register receives a full address on bus 25, data on bus 26 and a write/read command on line 27, as shown in FIG. 2. Writing or reading to/from the register in signal unit 23 is similar to writing or reading to/from any other memory location accessible by DSPØ. The logic that performs the memory mapping (shown in FIGS. 4 and 6) decodes the address to determine if the register is being accessed, and the read/write command determines whether data on the data bus is being loaded to the register or data is being driven onto the data bus from the register.

An off-core register is not accessible in the DSP's address space. Dedicated hardware in the DSP directly accesses this type of register. The register is accessed by using read/write strobes from the hardware and compiler support to provide instructions to access the hardware. The address and read/write decoding necessary in memory-mapped register operations is unnecessary for off-core register operations. As shown in FIG. 3 (and in greater detail in FIG. 5), data bus 36 and write strobe line 37 are connected to signal unit 33; the address bus is not used.

Figure 4:
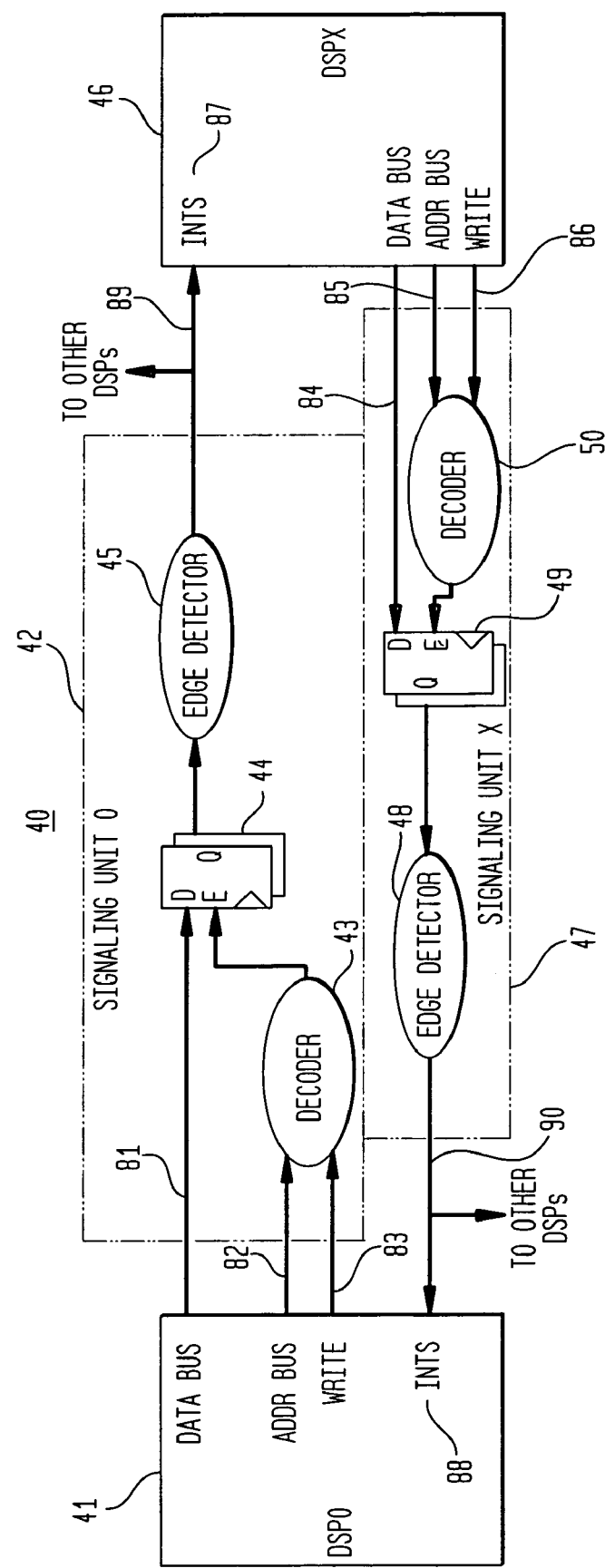
FIG. 4 is a block diagram illustrating a bi-directional inter-DSP signaling system between multiple DSPs in accordance with the present invention.

Referring to FIG. 4, inter-DSP signaling between multiple DSPs will now be explained in greater detail. As shown, bi-directional inter-DSP signaling system 40 includes multiple DSPs; only two (DSPØ and DSPX) are shown, respectively designated as 41 and 46. Signaling unit Ø, generally designated as 42, forms a set of output signals from data bits having been placed on data bus 81 by DSPØ. The formed output signals are placed on dedicated lines 89 and routed to the interrupt terminals of respective DSPs. For example, one interrupt terminal, designated as 87, is shown in DSPx.

Similarly, signaling unit x, generally designated as 47, forms another set of output signals from data bits having been placed on data bus 84 by DSPx. The output signals are placed on dedicated lines 90 and routed to the interrupt terminals of respective DSPs. For example, one interrupt terminal, designated as 88, is shown in DSPØ.

Data bits on data bus 81 are stored in memory-mapped register 44, after decoder 43 determines that the address placed on address bus 82 matches the address of register 44. Decoder 43 is enabled by a write command on line 83 and register 44 is enabled by an output signal from decoder 43. When data is clocked out from the Q output terminal of register 44, the data is detected by edge detector 45. A logic ONE on any data bit from register 44 provides an output signal on a specific line of dedicated lines 89. The output signal may then be provided as an interrupt signal to any processor, for example, an interrupt signal to interrupt terminal 87 of DSPx.

Similarly, decoder 50 enables memory-mapped register 49, after a write command is placed on line 86 and a correct address is placed on address bus 85. Edge detector 48 detects a logic ONE on any data bit being clocked out from register 49 and provides an output signal on dedicated lines 90. The output signal is routed to any processor for use as an interrupt signal. For example, the output signal may be routed to interrupt terminal 88 of DSPØ, as shown in FIG. 4.

It will be appreciated that data busses 81 and 84 each transmit parallel data bits, for example 16 parallel data bits on 16 parallel lines, respectively. Similarly, registers 44 and 49 each include multiple flip/flops, for example 16 flip/flops, each flip/flop storing one bit of data. Edge detectors 45 and 48 are each capable of detecting a logic ONE from any Q output terminal of the multiple flip/flops of respective registers 44 and 49. Each edge detector may then provide multiple output signals for use as interrupts. For example, if register 44 includes 16 flip/flops, then 16 independent output signals may be provided to multiple processors for use as interrupts.

Figure 5:
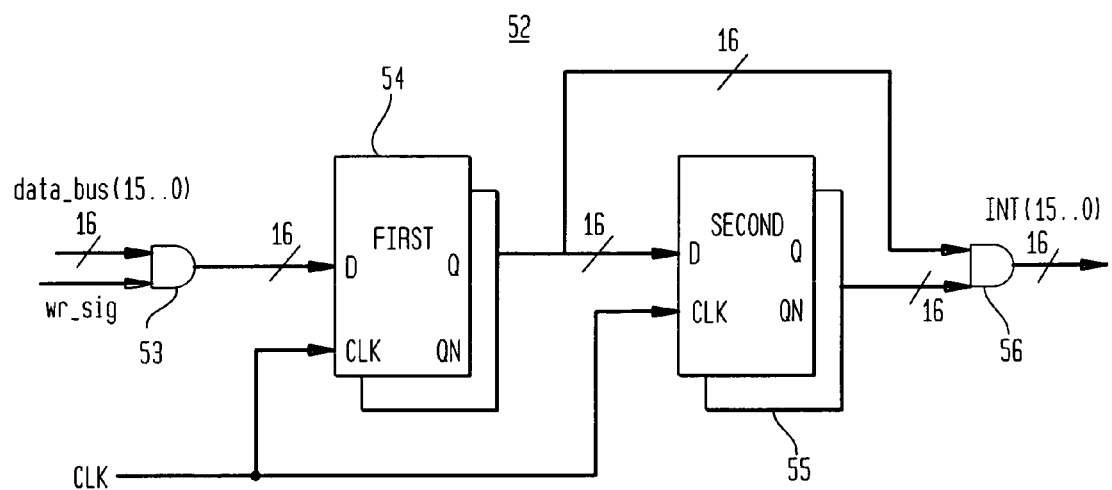
FIG. 5 is a block diagram illustrating an exemplary embodiment of inter-DSP signaling using an off-core register implementation in accordance with the present invention.
Figure 6:
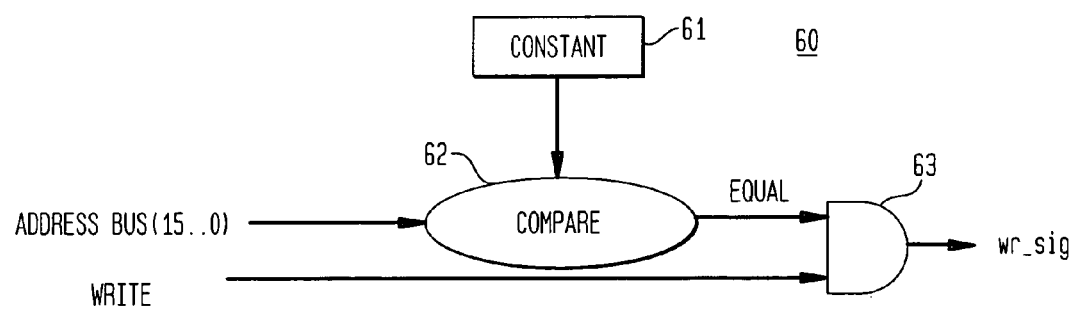
FIG. 6 is a block diagram showing logic circuitry for converting the off-core register implementation of FIG. 5 to a memory-mapped register implementation in accordance with the present invention.

Operation of the inter-DSP signaling system will now be explained in greater detail by referring to FIGS. 5-7. FIG. 5 depicts a signaling unit, generally designated as 52. The decoder function includes a set of 16 AND-gates 53. The register includes a first set of 16 flip/flops 54 and the edge detector includes a second set of 16 flip/flops 55 and a set of 16 AND-gates 56.

A write strobe (wr_sig) is provided to each AND-gate of the 16 AND-gates 53. Each data bit of data bus (15..0) is also provided to one AND-gate of the 16 AND-gates 53. Each AND-gate 53 is enabled, when the write strobe is a logic ONE and a respective data bit is a logic ONE. A logic ONE is clocked into a respective flip/flop 54 of the register by the clock signal. On the next clock, the data passes from flip/flop 54 into flip/flop 55. An interrupt signal is enabled on one of the output lines (int(15 . . . 0)) when a respective Q terminal of flip/flop 54 has a logic ONE and a respective QN (Q-not) terminal of flip/flop 55 has a logic ONE.

Figure 7:
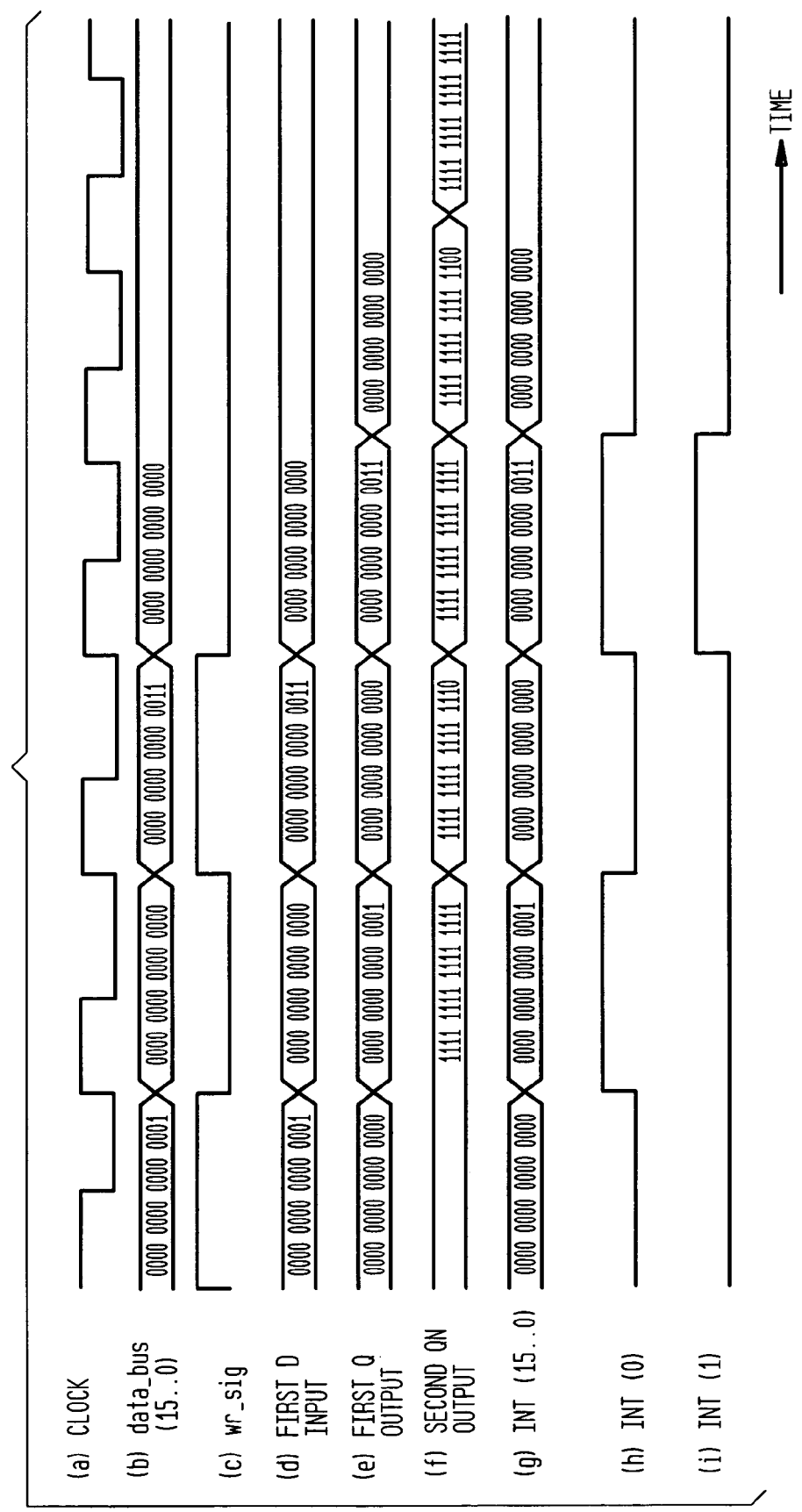
FIGS. 7(a)-7(i) are timing diagrams showing the relationship of signals as they appear at various points in the exemplary embodiment of FIG. 5.

The operation of signaling unit 52 may be better understood by referring to FIG. 7. As shown, the input signals to system 52, namely the clock, the data on data bus (15 . . . 0) and the write strobe (wr_sig), are illustrated as a function of time, respectively in FIGS. 7(a)-7(c). For example, data bit Ø (LSB) is a logic ONE during the first clock cycle and data bits Ø and 1 are both logic ONE during the third clock cycle, as shown in FIG. 7(*b*).

The signal provided to the D terminal of each of the first set of 16 flip/flops 54 (the register) is shown in FIG. 7(*d*). The signal is the same as the signal shown in FIG. 7(*b*). The output signal from the Q terminal of each of the 16 flip/flops 54 is shown in FIG. 7(*e*). The output signal is delayed by one clock cycle from the input signal at the D terminals of the register. FIG. 7(*f*) depicts the output signal from the QN output terminals of the second set of 16 flip/flops 55. The second QN output signal is a logical inverse of the first Q output signal, after it is delayed by one clock cycle.

After logically combining the output signal from the Q output terminals of the register and the output signal from the QN output terminals of the second set of flip/flops 55, AND-gate 56 generates an interrupt signal (int(15 . . . 0)), as shown in FIG. 7(*g*). The first write signal (FIG. 7(*c*)) sets bit Ø, which causes int(0) to be asserted for one clock cycle, as shown in FIG. 7(*h*). The second write signal (FIG. 7(*c*)) sets bits 0 and 1, which causes both int(0) and int(1) to be asserted for one clock cycle, as shown in FIGS. 7(*h*) and 7(*i*), respectively.

Register 54, as shown in FIG. 5, is an off-core implementation. To convert register 54 from an off-core implementation to a memory-mapped implementation, the circuitry shown in FIG. 6 may be incorporated into the inter-DSP signaling system of FIG. 5. The wr_sig signal of FIG. 5 is replaced by an address bus, a write/read signal and logic circuitry for comparing the address on the address bus to the address of the register. Circuit 60, which performs the logic, includes comparator 62, constant 61 and AND-gate 63. As shown, when the address on address bus (15.0) matches the address of the register (shown as constant 61) and the write command is set, AND-gate 63 enables the write signal.

The signaling system described herein may be used by any one DSP to synchronize with any other DSP or multiple DSPs by simply writing a logic one to the appropriate bit at the appropriate address. Any register (memory mapped or off-core) may be used by the DSP. Since existing registers are used, it will be appreciated that modifications are not required to existing DSP circuitry. The described method of signaling may be repeated between any pair of DSPs. The interrupt lines from any DSP may also be connected to any number of other DSPs, enabling one DSP to signal multiple DSPs. Furthermore, the DSPs (or other types of processors) and the signaling unit may be implemented on an integrated circuit (IC).

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the present invention is not limited to only the DSP described. Rather, the invention may be extended to be used by any processor or microprocessor.

What is claimed is:

1. In a system comprising a first processor and one or more other processors, a method for applying one or more interrupt signals to the one or more other processors, the method comprising:
   (a) generating, in the first processor, a data word having two or more data bits, wherein each data bit has either a first bit value or a second bit value;
   (b) transmitting the data word from a data port of the first processor to a signal unit external to the first processor and the one or more other processors;
   (c) converting, in the signal unit, the data word into two or more interrupt signals by analyzing the bit value of each of two or more data bits in the data word, wherein each analyzed data bit in the data word having a specified bit value corresponds to a different interrupt signal; and
   (d) transmitting each interrupt signal from the signal unit to an interrupt port of an other processor, wherein the signal unit detects a transition in each analyzed data bit of the data word over time to determine when to generate a corresponding interrupt signal.

2. The invention of claim 1, wherein at least two interrupt signals are transmitted to two different interrupt ports of a single other processor.

3. The invention of claim 1, wherein at least two interrupt signals are transmitted to interrupt ports of at least two different other processors.

4. The invention of claim 1, wherein the signal unit detects the transition by:
   storing sequential values for the corresponding data bit in two registers; and
   comparing outputs from the two registers to detect a difference between the two sequential values.

5. The invention of claim 4, wherein:
   the first processor transmits an address signal to the signal unit; and
   the signal unit compares the address signal to a specified value to determine whether to store the two sequential values in the two registers.

6. The invention of claim 1, wherein each interrupt signal is transmitted from the signal unit to a corresponding interrupt port of a corresponding other processor via a dedicated line.

7. The invention of claim 6, wherein the data word is transmitted from the first processor to the signal unit via a shared data bus.

8. The invention of claim 1, further comprising applying an interrupt signal from an other processor to the first processor by:
   (1) generating, in the other processor, an other data word having one or more other data bits, wherein each other data bit has either the first bit value or the second bit value;
   (2) transmitting the other data word from a data port of the other processor to an other signal unit external to the first processor and the one or more other processors;
   (3) converting, in the other signal unit, the other data word into one or more other interrupt signals by analyzing the bit value of each of one or more other data bits in the other data word, wherein each analyzed other data bit in the other data word having the specified bit value corresponds to a different other interrupt signal; and
   (4) transmitting an other interrupt signal from the other signal unit to an interrupt port of the first processor.

9. The invention of claim 8, wherein at least one other interrupt signal is transmitted from the other signal unit to an interrupt port of at least one other processor.

10. A system comprising a first processor connected to one or more other processors via a signal unit external to the first processor and the one or more other processors, wherein:
   the first processor is adapted to (i) generate a data word having two or more data bits, wherein each data bit has either a first bit value or a second bit value, and (ii)

transmit the data word from a data port of the first
processor to the signal unit;

the signal unit is adapted to (i) convert the data word into
two or more interrupt signals by analyzing the bit value
of each of two or more data bits in the data word,
wherein each analyzed data bit in the data word having
a specified bit value corresponds to a different interrupt
signal, and (ii) transmit each interrupt signal from the
signal unit to an interrupt port of an other processor;
and the signal unit is adapted to detect a transition in each
analyzed data bit of the data word over time to determine when to generate a corresponding interrupt signal.

11. The invention of claim 10, wherein the signal unit is connected to transmit at least two interrupt signals to two different interrupt ports of a single other processor.

12. The invention of claim 10, wherein the signal unit is connected to transmit at least two interrupt signals to interrupt ports of at least two different other processors.

13. The invention of claim 10, wherein the signal unit comprises:

two registers adapted to store sequential values for each analyzed data bit; and logic adapted to compare outputs from the two registers to detect the transition for a corresponding data bit as a difference between the two sequential values.

14. The invention of claim 13, wherein:

the first processor is adapted to transmit an address signal to the signal unit; and the signal unit comprises an address decoder adapted to compare the address signal to a specified value to determine whether to store the two sequential values in the two registers.

15. The invention of claim 10, wherein the signal unit is connected to transmit each interrupt signal to a corresponding interrupt port of a corresponding other processor via a dedicated line.

16. The invention of claim 15, wherein the first processor is connected to transmit the data word to the signal unit via a shared data bus.

17. The invention of claim 10, further comprising an other signal unit connecting an other processor to the first processor, wherein:

the other signal unit is external to the first processor and the one or more other processors;

the other processor is adapted to (i) generate an other data word having one or more other data bits, wherein each other data bit has either the first bit value or the second bit value, and (ii) transmit the other data word from a data port of the other processor to the other signal unit; and the other signal unit is adapted to (i) convert the other data word into one or more other interrupt signals by analyzing the bit value of each of one or more other data bits in the other data word, wherein each analyzed other data bit in the other data word having the specified bit value corresponds to a different other interrupt signal and (ii) transmit an other interrupt signal from the other signal unit to an interrupt port of the first processor.

18. The invention of claim 17, the other signal unit is adapted to transmit at least one other interrupt signal to an interrupt port of at least one other processor.

19. A signal unit for a system comprising a first processor connected to one or more other processors via the signal unit external to the first processor and the one or more other processors, wherein:

the first processor is adapted to (i) generate a data word having two or more data bits, wherein each data bit has either a first bit value or a second bit value, and (ii) transmit the data word from a data port of the first processor to the signal unit;

the signal unit is adapted to (i) convert the data word into two or more interrupt signals by analyzing the bit value of each of two or more data bits in the data word, wherein each analyzed data bit in the data word having a specified bit value corresponds to a different interrupt signal, and (ii) transmit each interrupt signal from the signal unit to an interrupt port of an other processor;

the data word has a plurality of analyzed data bits;

the signal unit is adapted to convert the data word into a plurality of interrupt signals; and the signal unit is adapted to transmit each interrupt signal to a different interrupt port of an other processor;

the signal unit is adapted to transmit at least two interrupt signals to two different interrupt ports of a single other processor;

the signal unit is adapted to transmit at least two interrupt signals to interrupt ports of at least two different other processors;

the signal unit is adapted to detect a transition in each analyzed data bit of the data word over time to determine when to generate a corresponding interrupt signal;

the signal unit is adapted to receive the data word from the first processor via a shared data bus; and the signal unit is adapted to transmit each interrupt signal to a corresponding interrupt port of a corresponding other processor via a dedicated line.

20. In a system comprising a first processor and one or more other processors, a method for applying one or more interrupt signals to the one or more other processors, the method comprising:

(a) generating, in the first processor, a data signal having two or more data bits, wherein each data bit has either a first bit value or a second bit value;

(b) transmitting the data signal from a data port of the first processor to a signal unit external to the first processor and the one or more other processors;

(c) converting, in the signal unit, the data signal into one or more interrupt signals by analyzing the bit value of each of two or more data bits in the data signal, wherein each analyzed data bit in the data signal having a specified bit value corresponds to a different interrupt signal; and (d) transmitting each interrupt signal from the signal unit to an interrupt port of an other processor, wherein:

the signal unit detects a transition in each analyzed data bit of the data signal over time to determine when to generate a corresponding interrupt signal; and the signal unit detects the transition by:

storing sequential values for the corresponding data bit in two registers; and comparing outputs from the two registers to detect a difference between the two sequential values.

21. The invention of claim 20, wherein:

the first processor transmits an address signal to the signal unit; and the signal unit compares the address signal to a specified value to determine whether to store the two sequential values in the two registers.

22. A system comprising a first processor connected to one or more other processors via a signal unit external to the first processor and the one or more other processors, wherein:

the first processor is adapted to (i) generate a data signal having two or more data bits, wherein each data bit has either a first bit value or a second bit value, and (ii) transmit the data signal from a data port of the first processor to the signal unit; and the signal unit is adapted to (i) convert the data signal into one or more interrupt signals by analyzing the bit value of each of two or more data bits in the data signal, wherein each analyzed data bit in the data signal having a specified bit value corresponds to a different interrupt signal, and (ii) transmit each interrupt signal from the signal unit to an interrupt port of an other processor, wherein:

the signal unit is adapted to detect a transition in each analyzed data bit of the data signal over time to determine when to generate a corresponding interrupt signal; and the signal unit comprises:

two registers adapted to store sequential values for each analyzed data bit; and logic adapted to compare outputs from the two registers to detect the transition for a corresponding data bit as a difference between the two sequential values.

23. The invention of claim 22, wherein:

the first processor is adapted to transmit an address signal to the signal unit; and the signal unit comprises an address decoder adapted to compare the address signal to a specified value to determine whether to store the two sequential values in the two registers.

24. A signal unit for a system comprising a first processor connected to one or more other processors via the signal unit external to the first processor and the one or more other processors, wherein:

the first processor is adapted to (i) generate a data signal having two or more data bits, wherein each data bit has either a first bit value or a second bit value, and (ii) transmit the data signal from a data port of the first processor to the signal unit; and the signal unit is adapted to (i) convert the data signal into one or more interrupt signals by analyzing the bit value of each of two or more data bits in the data signal, wherein each analyzed data bit in the data signal having a specified bit value corresponds to a different interrupt signal, and (ii) transmit each interrupt signal from the signal unit to an interrupt port of an other processor, wherein:

the signal unit is adapted to detect a transition in each analyzed data bit of the data signal over time to determine when to generate a corresponding interrupt signal; and the signal unit comprises:

two registers adapted to store sequential values for each analyzed data bit; and logic adapted to compare outputs from the two registers to detect the transition for a corresponding data bit as a difference between the two sequential values.

25. The invention of claim 24, wherein:

the first processor is adapted to transmit an address signal to the signal unit; and the signal unit comprises an address decoder adapted to compare the address signal to a specified value to determine whether to store the two sequential values in the two registers.

26. In a system comprising a first processor and one or more other processors, a method for applying one or more interrupt signals to the one or more other processors, the method comprising:

(a) generating, in the first processor, a data word having two or more data bits, wherein each data bit has either a first bit value or a second bit value;

(b) transmitting the data word from a data port of the first processor to a signal unit external to the first processor and the one or more other processors;

(c) converting, in the signal unit, the data word into two or more interrupt signals by analyzing the bit value of each of two or more data bits in the data word, wherein each analyzed data bit in the data word having a specified bit value corresponds to a different interrupt signal; and (d) transmitting each interrupt signal from the signal unit to an interrupt port of an other processor, wherein at least two interrupt signals are transmitted to two different interrupt ports of a single other processor.

27. A system comprising a first processor connected to one or more other processors via a signal unit external to the first processor and the one or more other processors, wherein:

the first processor is adapted to (i) generate a data word having two or more data bits, wherein each data bit has either a first bit value or a second bit value, and (ii) transmit the data word from a data port of the first processor to the signal unit;

the signal unit is adapted to (i) convert the data word into two or more interrupt signals by analyzing the bit value of each of two or more data bits in the data word, wherein each analyzed data bit in the data word having a specified bit value corresponds to a different interrupt signal, and (ii) transmit each interrupt signal from the signal unit to an interrupt port of an other processor; and the signal unit is connected to transmit at least two interrupt signals to two different interrupt ports of a single other processor.

28. A system comprising a first processor connected to one or more other processors via a signal unit external to the first processor and the one or more other processors, wherein:

the first processor is adapted to (i) generate a data word having two or more data bits, wherein each data bit has either a first bit value or a second bit value, and (ii) transmit the data word from a data port of the first processor to the signal unit;

the signal unit is adapted to (i) convert the data word into two or more interrupt signals by analyzing the bit value of each of two or more data bits in the data word, wherein each analyzed data bit in the data word having a specified bit value corresponds to a different interrupt signal, and (ii) transmit each interrupt signal from the signal unit to an interrupt port of an other processor;

further comprising an other signal unit connecting an other processor to the first processor, wherein:

the other signal unit is external to the first processor and the one or more other processors;

the other processor is adapted to (i) generate an other data word having one or more other data bits, wherein each other data bit has either the first bit value or the second bit value, and (ii) transmit the other data word from a data port of the other processor to the other signal unit; and the other signal unit is adapted to (i) convert the other data word into one or more other interrupt signals by analyzing the bit value of each of one or more other data bits in the other data word, wherein each analyzed other data bit in the other data word having the specified bit value corresponds to a different other interrupt signal and (ii) transmit an other interrupt signal from the other signal unit to an interrupt port of the first processor.

29. The invention of claim 28, the other signal unit is adapted to transmit at least one other interrupt signal to an interrupt port of at least one other processor.

* * * * *